United States Patent [19]

Matsuda et al.

[11] Patent Number: 4,567,956
[45] Date of Patent: Feb. 4, 1986

[54] POWER PLANT ENCLOSURE ADAPTABLE TO ENVIRONMENTAL CONDITIONS

[75] Inventors: Takehiko Matsuda; Kenji Taira, both of Komatsu, Japan

[73] Assignee: Kabushiki Kaisha Komatsu Seisakusho, Tokyo, Japan

[21] Appl. No.: 357,650

[22] Filed: Mar. 12, 1982

[30] Foreign Application Priority Data

Mar. 26, 1981 [JP] Japan .................. 56-41489[U]

[51] Int. Cl.$^4$ .......................................... B60K 11/04
[52] U.S. Cl. .................... 180/68.1; 180/69.2
[58] Field of Search ............... 180/54 A, 54 D, 69 R, 180/68 P, 68.1, 69.2; 160/92; 123/195 C; 296/95 Q, 96

[56] References Cited

U.S. PATENT DOCUMENTS

| | | | |
|---|---|---|---|
| 1,283,765 | 11/1918 | Hill | 180/68.1 |
| 1,573,659 | 2/1926 | Thompson | 180/68.1 |
| 1,733,770 | 10/1929 | Andrake | 180/69.2 |
| 2,707,031 | 4/1955 | Williams | 180/68.1 |
| 2,793,723 | 5/1957 | Martin | 160/92 X |
| 3,358,787 | 12/1967 | Bangasser et al. | 180/69 R |
| 3,786,891 | 1/1974 | Vogelaar et al. | 180/68.1 X |
| 3,960,238 | 6/1976 | McClure et al. | 180/68.1 X |
| 4,071,107 | 1/1978 | Leighty | 180/69 R |
| 4,137,983 | 2/1979 | Gray | 180/69.24 |
| 4,341,277 | 7/1982 | Adamson et al. | 180/68.1 X |

*Primary Examiner*—Joseph F. Peters, Jr.
*Assistant Examiner*—Michael Mar
*Attorney, Agent, or Firm*—Armstrong, Nikaido, Marmelstein & Kubovcik

[57] ABSTRACT

A power plant enclosure for off-highway work vehicles comprises a radiator guard, a ceiling or hood, a pair of sidewalls, and a floor or bottom guard which are bolted to each other and to vehicle frames to define a power plant compartment. The ceiling has a power plant servicing opening and an air intake opening, and each sidewall has another power plant servicing opening. Closing each opening in the enclosure is a lid of dual panel construction consisting of an inner, meshed panel and an outer, solid panel bolted to each other. Thus each opening can be closed either by both the meshed panel and the solid panel, to shut off ambient air as in subfreezing weather, or by only the meshed panel to admit ambient cooling air into the power plant compartment and to prevent the entrance of flammable matter in nonfreezing weather.

4 Claims, 5 Drawing Figures

POWER PLANT ENCLOSURE ADAPTABLE TO ENVIRONMENTAL CONDITIONS

BACKGROUND OF THE INVENTION

Our invention pertains to an enclosure for a power plant, that is, an engine together with its auxiliary equipment such as a radiator, a fan, an air cleaner, etc. Our invention deals more specifically with such a power plant enclosure readily adaptable to ambient temperatures and other environmental conditions for efficiently air-cooling, or not air-cooling, the engine, with provisions for allowing easy servicing of the engine and its auxiliary equipment. The power plant enclosure of our invention is particularly well suited for use on tractors and other off-highway work vehicles.

Off-highway work vehicles of each production model are usually expected to operate under varying climatic conditions, some in subfreezing, and others in tropical, regions. Still others may work in areas where the temperature varies over a wide range from season to season. The enclosures for the power plants of such work vehicles must therefore be readily adaptable to ambient temperatures, by being either opened or closed, in order to minimize their influences on the engine. Overheating and overcooling of the engine can both be detrimental to its operation.

The protection of the engine from ambient temperatures is not the sole function of the power plant enclosure. Even when opened for air-cooling the engine, the enclosure must prevent the intrusion of flammable solids into the power plant compartment. Wood leaves, for example, on accumulation in the power plant compartment could give rise to a fire from the heat of the engine. Another important requirement for any power plant enclosure is ready accessibility to the power plant compartment, for the upkeep of the enclosed equipment.

As far as we are aware, there has been suggested no power plant enclosure meeting all the foregoing requirements. For each model of vehicles, therefore, a variety of enclosures have had to be designed and manufactured to suit the climates of the regions to which the vehicles are to be shipped. This conventional practice has necessitated the provision of an inordinately large number of parts to make up such a variety of enclosures.

SUMMARY OF THE INVENTION

Our invention gives an end to the conventional practice of preparing a variety of power plant enclosures for each model of vehicles or other machines and provides a versatile power plant enclosure capable of ready adaptation to the varying environmental conditions under which the vehicles or machines are to work. The power plant enclosure can be opened or closed, for the admission or nonadmission of external air, depending upon ambient temperatures. When opened for the admission of ambient cooling air, moreover, the enclosure is nevertheless capable of shutting out flammable solids. The enclosure is also constructed with a view to optimum accessibility to the enclosed engine and its appendages.

Stated in brief, the power plant enclosure in accordance with out invention features means closing a plurality of servicing and air intake openings formed in wall means defining a power plant compartment. The closing means comprise an inner, open-worked panel for each opening in the wall means, and an outer, solid panel removably attached to each open-worked panel. The dual-panel lids, so to say, closing at least the servicing openings are readily openable to allow access to the power plant compartment.

A preferred form of each open-worked panel is wire net carried by a rigid holder frame sized to the opening to be covered. The outer, solid panel is bolted or otherwise removably fastened to the holder frame.

Thus, in the use of the power plant enclosure at nonfreezing ambient temperatures, the solid panels of the dual-panel lids may be unfastened from the wire net holder frames to permit inflow of external cooling air into the power plant compartment through the wire nets. The wire nets will then serve to prevent the intrusion of wood leaves or like flammable matter into the power plant compartment. In subfreezing weather, on the other hand, the solid panels may be bolted to the wire net holder frames to shut off ambient air.

It is evident from the foregoing that the power plant enclosure in accordance with our invention is adaptable to widely varying climatic conditions merely by selective use of the solid and open-worked panels for closing its servicing and air intake openings. Thus selectively opened or closed, the enclosure will efficiently protect the engine from overheating in warm or hot weather and from overcooling at extremely low ambient temperatures. The servicing of the enclosed power plant is easy because the dual-panel lids for at least the servicing openings are attached to the enclosure in a readily openable, or detachable, manner regardless of whether the solid panels are fastened to or unfastened from the wire net holder frames.

The above and other features and advantages of our invention and the manner of attaining them will become more apparent, and the invention itself will best be understood, from a study of the following description of a preferred embodiment illustrated in the attached drawings.

DESCRIPTION OF THE PREFERRED EMBODIMENT

Figure 1:
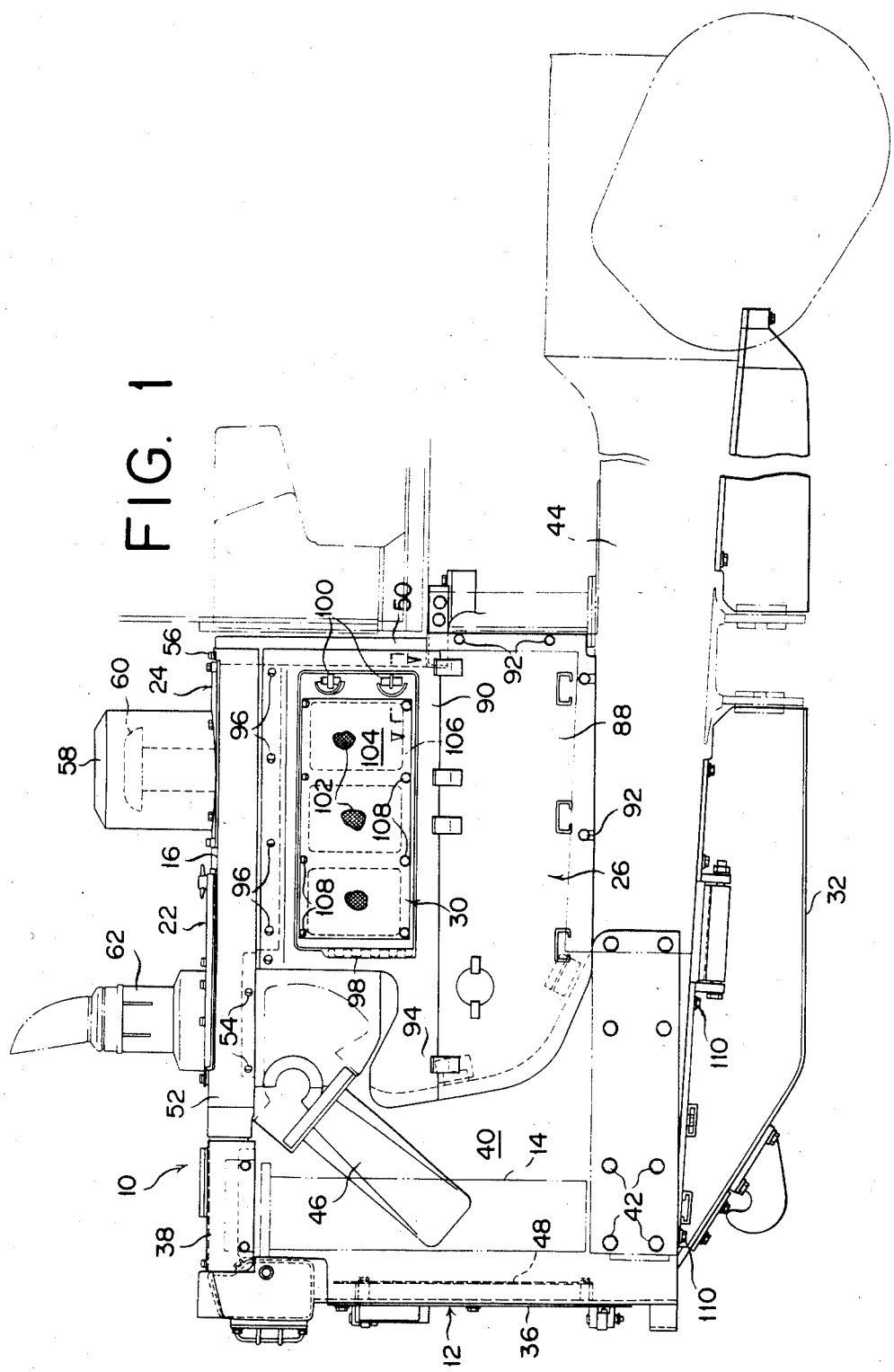
FIG. 1 is a side elevation, with parts shown broken away for illustrative convenience, of the power plant enclosure in accordance with our invention as adapted for use on a tractor, the enclosure being shown together with some pertinent parts of the tractor.

We will now describe in detail the power plant enclosure of our invention as adapted specifically for use on a tractor to be equipped with a dozer blade assembly to provide what is known as a bulldozer. Generally identified by the reference numeral 10 in FIGS. 1, 2 and 3, the exemplary power plant enclosure broadly comprises:

1. A radiator guard 12 at the front end of the enclosure 10, directed to the left in FIGS. 1 and 2, for housing and protecting a phantom radiator 14.

2. A ceiling or hood 16 having formed therein a power plant servicing opening 18 and an air intake opening 20 which are closed by dual-panel lids 22 and 24 respectively, at least the lid 22 on the servicing opening 18 being readily openable.

3. A pair of sidewalls 26, one seen in FIG. 1, each having formed therein another power plant servicing opening 28 which is openably closed by a dual-panel lid 30.

4. A floor or bottom guard 32.

Figure 4:
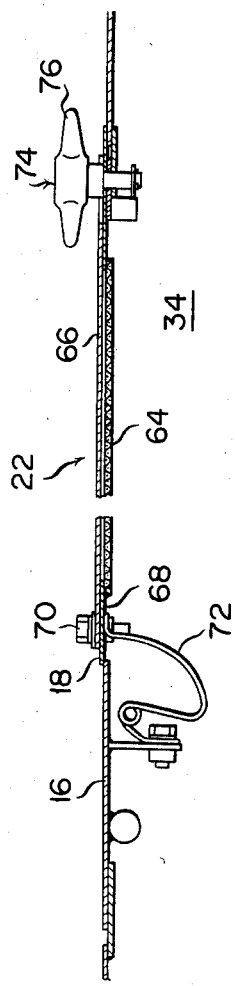
FIG. 4 is an enlarged section taken along the line IV—IV of FIG. 2 to illustrate the details of the dual-panel lid closing the servicing opening in the ceiling or hood of the enclosure.

The radiator guard 12, the ceiling 16, the sidewall pair 26, and the floor 32 are bolted to each other and to tractor frames to define in combination a power plant compartment, indicated at 34 in FIG. 4, for accommodating the vehicle engine, not shown, together with its auxiliary equipment, altogether referred to as the power plant. What follows is a more detailed discussion of these constituents of the power plant enclosure 10, in the sequence of their enumeration above.

Itself of conventional make, the radiator guard 12 comprises a perforated radiator mask 36 in front, a top panel 38, and a pair of side panels 40. The side panel pair is bolted at 42 to a tractor main frame 44, as in FIG. 1, thereby holding the complete radiator guard in position on the vehicle. These side panels have a pair of brackets 46 attached respectively thereto for the mounting of dozer blade lift cylinders, not shown. Arranged interiorly of the radiator mask 36, and just forwardly of the radiator 14, is an optional radiator shutter 48 which is intended for use only in extremely cold weather. The radiator shutter is therefore readily removable; or the power plant enclosure 10 may not be furnished with such a shutter if the vehicle is to be put to use in hot or warm regions.

The ceiling or hood 16 extends between the radiator guard top panel 38 and a support frame 50 bounding the rear end of the power plant compartment 34. The ceiling has portions 52, one seen in FIG. 1, depending from its opposite sides. These depending portions are bolted at 54 to the radiator guard side panels 40, and the ceiling proper is further bolted at 56 to the support frame 50.

Figure 2:
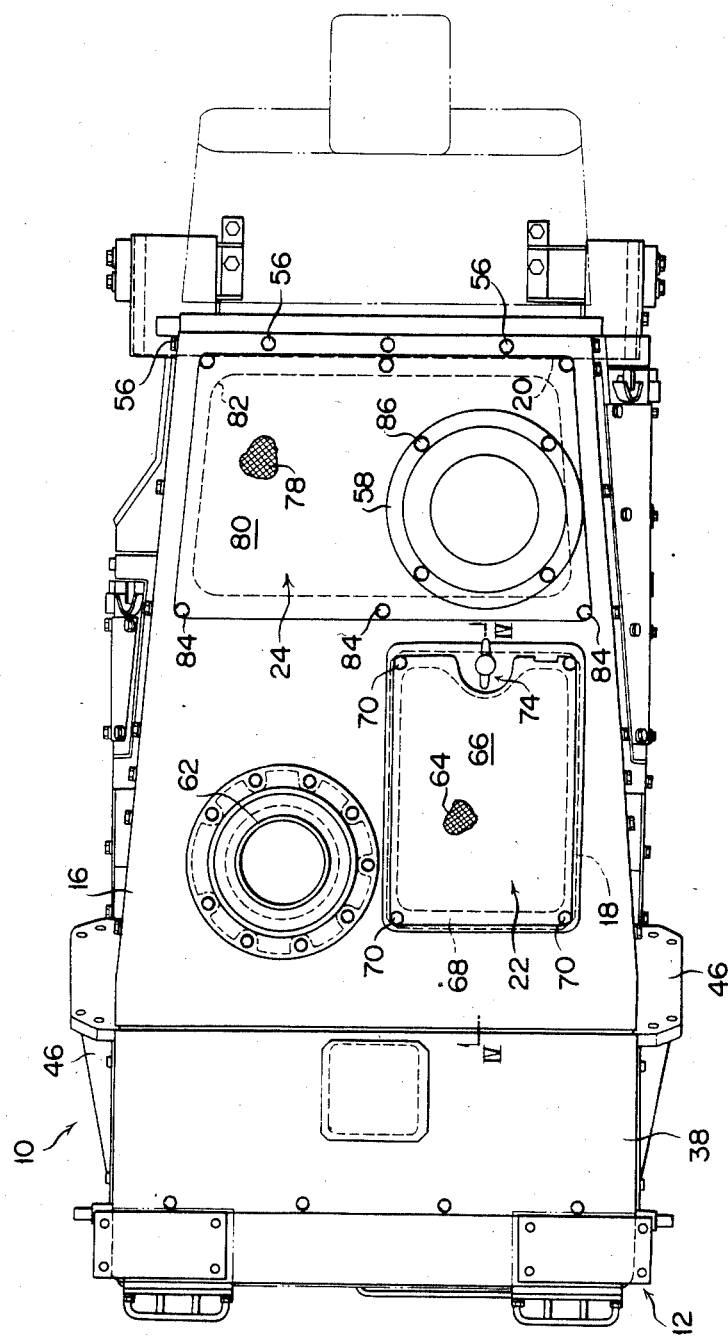
FIG. 2 is a top plan of the power plant enclosure of FIG. 1.
Figure 3:
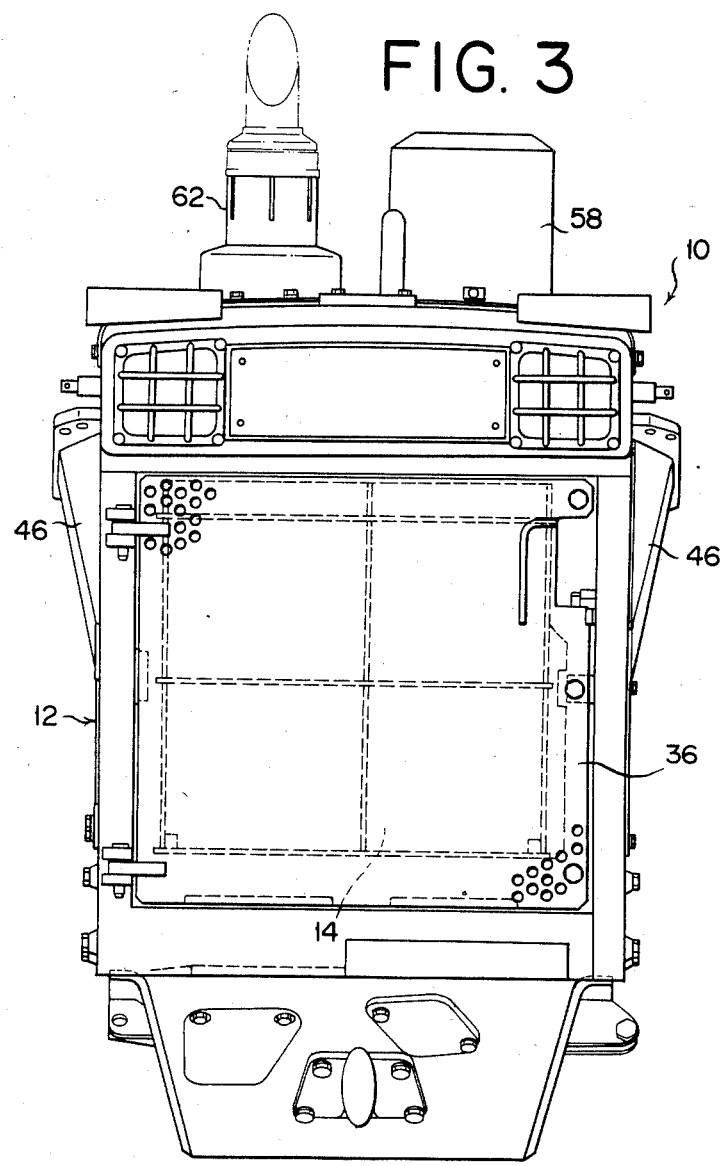
FIG. 3 is a front elevation of the power plant enclosure as seen from the left hand side of FIG. 1.

FIG. 2 best illustrates the arrangement of the openings in, and parts on, the ceiling 16. Situated adjacent the front end of the ceiling and off its longitudinal median line, the power plant servicing opening 18 is intended for the replacement or cleaning of the filter element in the engine air cleaner, so that we will call this opening the air cleaner service opening. The air intake opening 20 generally extends transversely of the ceiling at its rear end. As the name implies, the air intake opening is intended for the admission of ambient cooling air into the power plant compartment 34. The lid 24 openably closing this air intake opening has a cover 58 removably attached thereto for housing an engine air precleaner identified by the reference numeral 60 in FIG. 1. An exhaust muffler and stack 62 is also mounted on the ceiling adjacent its front end.

Attention is now called to the details of the lid 22 on the air cleaner service opening 18 represented in FIG. 4. As has been mentioned, the lid 22 is of dual panel construction, comprising an inner, open-worked panel 64 and an outer, solid panel 66. The open-worked panel 64 takes the form of wire net in the illustrated embodiment, carried by a rigid, rectangular holder frame 68 shaped in conformity with the air cleaner service opening and sized only slightly more than the opening. The solid panel 66 is removably attached to the holder frame 68 as by means of bolts 70. Spring means 72 urge the lid 22 outwardly of the air cleaner service opening 18, and a latch mechanism 74 of any suitable design normally retains the lid in the closed position, as pictured, against the force of the spring means. By the turn of a knob 76 of the latch mechanism 74, therefore, the lid 22 will spring open. It is to be noted, however, that the illustrated spring means 72 and latch mechanism 74 represent but one example of means for making the lid readily openable. A simple bolting of the lid to the ceiling 16 will serve the purpose, even though to a lesser degree.

A more important feature of our invention is that the lid 22 comprises the open-worked panel 64 and the solid panel 66, and that these are removably fastened together. The solid panel may be removed when the ambient temperature is not too low, to allow introduction of external cooling air into the power plant compartment through the open-worked panel. The removal of the open-worked panel during the operation of the bulldozer, although possible, is not recommended because it serves to prevent the intrusion of leaves and other solids that might burn from the heat of the engine.

Reference is directed back to FIGS. 1 and 2, and in particular to FIG. 2, in order to discuss the construction and functions of the lid 24, together with the precleaner cover 58 thereon, closing the air intake opening 20 in the ceiling 16 of the power plant enclosure 10. Sized to completely cover the air intake opening, the lid 24 is essentially identical in construction with the lid 22 on the air cleaner service opening 18, comprising an inner, open-worked panel 78 and an outer, solid panel 80. The open-worked panel 78 also takes the form of wire net carried by a rigid holder frame 82. The solid panel 80 is bolted at 84 to the net holder frame 82 and further to the ceiling 16 of the power plant enclosure. Thus is the solid panel 80 removable from the open-worked panel 78, and so is the complete dual-panel lid 24 from the air intake opening 24.

It will be observed from FIG. 1 that the engine air precleaner 60 projects out of the air intake opening 20 by extending through the lid 24. The cover 58 of cylindrical shape is removably mounted on the lid 24, as with bolts 86, to loosely envelope the precleaner 60.

The manner of use of the dual-panel lid 24, as well as the precleaner cover 58, on the air intake opening 20 is subject to change depending upon the ambient temperature and other working conditions of the bulldozer. The air intake opening should be closed with the solid panel 80, in addition to the open-worked panel 78, at temperatures below 0° C. Direct exposure to the engine to such cold air is undesirable because then it would overcool. The engine will not overheat at such low ambient temperatures if the air intake and all the other openings in the power plant enclosure 10 are solidly closed.

At higher ambient temperatures, on the other hand, the solid panel 80 may be removed by loosening the bolts 84, leaving only the open-worked panel 78 over the air intake opening 20. The removal of the solid panel, and the consequent circulation of cooling air through the power plant compartment, will preclude the possibility of engine overheating even at high ambient temperatures. The remaining open-worked panel 78 acts as a kind of filter, obstructing the intrusion of combustible matter into the power plant compartment.

The precleaner cover 58 on the lid 24 is also subject to use or nonuse depending upon circumstances. At subfreezing temperatures the precleaner over should be held bolted to the outer, solid panel 80 of the lid 24 in order to prevent the cold ambient air to be drawn directly into the precleaner 60. The precleaner will then draw air from within the solidly closed power plant enclosure. The cover 58 will also function to prevent the intrusion of snow or rain into the precleaner. In nonfreezing weather, too, the use of the precleaner cover is advisable if the bulldozer is to work in an overgrown area. Since then the solid panel 80 is removed as aforesaid, the precleaner cover may be suitably attached to the open-worked panel 78. Thus the precleaner will draw ambient air through the open-worked panel, without the least possibility of taking in the leaves of trees and other forms of vegetation. The precleaner cover can of course be removed, together with the solid panel, in nonfreezing weather and if the work site of the vehicle is not overgrown.

Referring particularly to FIG. 1, we will now discuss the pair of sidewalls 26 of the power plant enclosure 10 and means associated therewith. The two sidewalls are of identical make, so that we will describe the one seen in FIG. 1, it being understood that the same description applies to the other.

The representative sidewall 26 of FIG. 1 comprises two discrete sections, a lower, mudguard panel 88 and an upper, access panel 90 which are readily separable from each other. The mudguard panel 88 is bolted at 92 to the tractor main frame 44 and to the support frame 50 for the ease of detachment therefrom. Rigidly affixed to the top edge of this mudguard panel are several retainers or rests 94 for engaging and holding in place the bottom edge of the access panel 90. The top edge of the access panel is bolted at 96 to one of the depending side portions 52 of the power plant enclosure ceiling 16. The retainers 94 are such that, upon loosening of the bolts 96, the access panel is readily removable by being moved upwardly and away from the vehicle.

Figure 5:
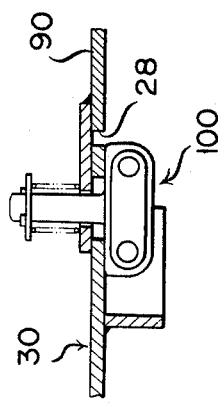
FIG. 5 is an enlarged section taken along the line V—V of FIG. 1 to illustrate the details of one of the latch mechanisms on the dual-panel lid closing the servicing opening in each sidewall of the enclosure.

Formed in the access panel 90, the aforesaid power plant servicing opening 28 is intended primarily for the checking and filling of engine oil and for the inspection of the engine service meter. In view of the relatively frequent need for doing such servicing and inspection, the lid 30 on this opening 28 is hinged at 98, along one of its vertical edges, to the access panel 90. The opposite vertical edge of the lid 30 is provided with a pair of latch mechanisms 100, one shown in detail in FIG. 5, for normally retaining the lid in the illustrated closed position.

The lid 30 openably closing the access panel opening 28 is also of dual-panel construction comprising an inner, open-worked panel 102 and an outer, solid panel 104. In the illustrated embodiment we have shown the open-worked panel 102 as wire net carried by a rigid, ribbed holder frame 106. It is this holder frame 106 that is hinged at 98 to the access panel 90 and further latched at 100 thereto. The solid panel 104 is bolted at 108 to the holder frame 106 of the open-worked panel 102.

As with the dual-panel lids closing the other openings in the power plant enclosure 10, the solid panel 104 of the lid 30 is to be held bolted to the wire net holder frame 106 only in extremely cold weather in order to avoid direct exposure of the engine to ambient air. At higher temperatures the solid panel should be unbolted from the wire net holder frame. The open-worked panel 102 will then pass the ambient air into the power plant compartment for effectively cooling the engine, while inhibiting the passage of undesired solids. It is possible, of course, to remove the complete access panel 90 by loosening the bolts 96 for more efficiently cooling the engine at still higher ambient temperatures, provided that the work site of the machine is not overgrown.

Last to be referred to is the floor or bottom guard 32, bolted at 110 to the tractor main frame 44. The floor is of conventional design and serves to close the bottom of the enclosure 10 to protect the enclosed power plant.

The foregoing will have made clear that the power plant enclosure in accordance with our invention is readily adaptable to the environmental conditions under which the machine equipped therewith is to work, effectively protecting the power plant from the influences of the environment and at the same time providing for easy access to the enclosed equipment. It will also be seen that while we have shown and described our power plant enclosure as adapted specifically for a bulldozer, the inventive concepts find application to other types of machines incorporating a similar power plant.

What is claimed is:

1. In a vehicle, a power plant enclosure system readily adaptable to ambient temperatures and other environmental conditions, comprising:
   (a) vehicle frame means;
   (b) wall means on the vehicle frame means defining a power plant compartment, the wall means comprising:
      (1) a ceiling having a first power plant servicing opening formed therein; and
      (2) a pair of sidewalls each having a second power plant servicing opening formed therein, each of the sidewalls being removable connected to the ceiling at its upper side and to the vehicle frame means at its lower side;
   (c) a first dual-panel lid closing each opening formed in the ceiling of the wall means, the first dual-panel lid comprising:
      (1) an inner, open-worked panel; and
      (2) an outer, solid panel removably attached to the open-worked panel;
   (d) a second dual-panel lid closing each opening formed in the pair of sidewalls, the second dual-panel lid being openably hinged to each sidewall and comprising:
      (1) an inner, open-worked panel; and
      (2) an outer, solid panel removably attached to the open-worked panel;
   (e) whereby each opening in the ceiling and sidewalls of the wall means can be closed either by the open-worked panel alone, to admit ambient cooling air into the power plant compartment and to prevent the entrance of solids, or by both the open-worked panel and the solid panel to shut off ambient air.

2. The vehicle power plant enclosure system of claim 1, wherein each open-worked panel is in the form of wire net with a rigid holder frame carrying same, and wherein each solid panel is removably fastened to the holder frame of one open-worked panel.

3. The vehicle power plant enclosure system of claim 1, further comprising:
   (a) an engine air precleaner projecting outwardly of an air intake opening in the ceiling of the wall means by extending through the lid closing the air intake opening; and
   (b) a cover removably attached to the lid of the air intake opening for enclosing the air precleaner.

4. The vehicle power plant enclosure system of claim 1, wherein each sidewall of the wall means comprises an upper access panel and a lower mudguard panel readily separable from each other, with the second power plant servicing opening formed in the access panel.

* * * * *